(12) United States Patent
Ke

(10) Patent No.: US 10,759,338 B1
(45) Date of Patent: Sep. 1, 2020

(54) INTELLIGENT DETECTION AND TAIL LIGHT CONTROL SYSTEM FOR AUTOMOBILES AND CONTROL METHOD THEREOF

(71) Applicant: LASTER TECH AUTOMOTIVE (SHANGHAI) CO., LTD., Shanghai (CN)

(72) Inventor: Zian Ke, Shanghai (CN)

(73) Assignee: Laser Tech Automotive (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 16/423,213

(22) Filed: May 28, 2019

(30) Foreign Application Priority Data

Mar. 20, 2019 (CN) .......................... 2019 1 0214232

(51) Int. Cl.
| | | |
|---|---|---|
| *B60Q 1/26* | (2006.01) | |
| *B60Q 1/52* | (2006.01) | |
| *B60Q 1/30* | (2006.01) | |
| *B60Q 1/44* | (2006.01) | |
| *B60Q 1/22* | (2006.01) | |
| *B60R 16/023* | (2006.01) | |
| *B60R 16/03* | (2006.01) | |
| *B60Q 1/34* | (2006.01) | |
| *H05B 45/10* | (2020.01) | |

(52) U.S. Cl.
CPC ............... *B60Q 1/525* (2013.01); *B60Q 1/22* (2013.01); *B60Q 1/30* (2013.01); *B60Q 1/34* (2013.01); *B60Q 1/44* (2013.01); *B60R 16/023* (2013.01); *B60R 16/03* (2013.01); *H05B 45/10* (2020.01)

(58) Field of Classification Search
CPC ........ B60Q 1/525; B60Q 1/444; B60Q 9/008; B60J 2201/022
See application file for complete search history.

(56) References Cited

U.S. PATENT DOCUMENTS

| | | | | |
|---|---|---|---|---|
| 7,365,641 B2 * | 4/2008 | Nou | ....................... | B60Q 1/525 340/436 |
| 8,536,994 B2 * | 9/2013 | Hada | ...................... | B60Q 1/525 340/435 |
| 9,090,203 B2 * | 7/2015 | Seifert | ................... | G08G 1/166 |
| 10,363,865 B2 * | 7/2019 | Bartell | ..................... | G01P 15/08 |
| 2014/0070937 A1 * | 3/2014 | Anderson | .............. | B60Q 1/447 340/464 |

FOREIGN PATENT DOCUMENTS

| | | |
|---|---|---|
| CN | 101190666 A | 6/2008 |
| CN | 201220626 Y | 4/2009 |
| CN | 101377685 B | 3/2012 |

(Continued)

*Primary Examiner* — Toan N Pham

(57) ABSTRACT

The invention relates to an intelligent detection and tail light control system for automobiles and a control method thereof, including: a detection module used for detecting driving data of the rear vehicle and the subject vehicle; and an intelligent operation module used for performing operation and judgment on the driving data and controlling the tail light based on a judgment result. According to the invention, without the intervention of the driver of the front vehicle, the tail lights can be automatically controlled; and the driver of the rear vehicle can timely see the change of the tail light of the front vehicle so as to react accordingly.

7 Claims, 2 Drawing Sheets

(56) References Cited

FOREIGN PATENT DOCUMENTS

| | | | |
|---|---|---|---|
| CN | 102381298 | A | 3/2012 |
| CN | 102463949 | A | 5/2012 |
| CN | 102582510 | A | 7/2012 |
| CN | 202624060 | U | 12/2012 |
| CN | 103978927 | A | 8/2014 |
| CN | 204279393 | U | 4/2015 |
| CN | 104786920 | A | 7/2015 |
| CN | 107170289 | A | 9/2017 |
| CN | 104627069 | B | 6/2018 |
| CN | 207809188 | U | 9/2018 |
| CN | 108662545 | A | 10/2018 |
| KR | 20140030726 | A | 3/2014 |

\* cited by examiner

INTELLIGENT DETECTION AND TAIL LIGHT CONTROL SYSTEM FOR AUTOMOBILES AND CONTROL METHOD THEREOF

CROSS REFERENCE TO RELATED APPLICATIONS

The present application claims the priority of Chinese Patent Application No. 201910214232.X filed on Mar. 20, 2019, the contents of which are incorporated herein by reference in their entirety.

TECHNICAL FIELD

The invention relates to the field of automobile intelligent control, in particular to an intelligent detection and tail light control system for automobiles and a control method thereof.

BACKGROUND ART

At present, tail lights of most automobiles are only limited to a few types such as brake lights, steering lights and reversing lights. When a front vehicle informs a rear vehicle through the tail lights, a vehicle owner of the front vehicle must carry out active control, such as braking, so that the brake lights are turned on and the vehicle owner of the rear vehicle can see it and appropriately control the speed of the rear vehicle accordingly.

Nowadays, due to traffic congestion, the distance between the front vehicle and the rear vehicle is often too close, sometimes when the front vehicle is braked rapidly, for a vehicle owner of the rear vehicle to decelerate when realizing the brake lights on, and accidents take place.

In major automotive systems, Advanced Driver Assistance Systems (ADAS), one of the intelligent vehicle technologies developed actively by automobile factories in recent years, represents a technology advancing process for achieving unmanned intelligent vehicles in the future. The main function of ADAS is not to control automobiles, but to provide the driver with information about the working condition of the automobile and the change of the environment outside the automobile for analysis, and to warn of possible dangerous situations in advance so that the driver can take appropriate measures accordingly in advance to avoid traffic accidents. ADAS is a system composed of up to 9 or even more functions, including a blind spot detection system, a supporting parking aid system, a rear collision warning system, an off-lane warning system, an impact relief braking system, a road-adaptive vehicle light system, a night vision system, an active vehicle distance control cruise system, a collision prevention system and a parking aid system. According to the present invention, in an impact relief braking system in the ADAS, a set of intelligent detection system is established to control tail light change so as to help a rear vehicle driver prepare early for the front vehicle condition.

SUMMARY OF THE INVENTION

Aiming at the defects of the prior art, the object of the invention is to provide an intelligent detection and tail light control system for an automobile and a control method thereof, which can detect the distance between a front vehicle and a rear vehicle in real time and automatically inform the rear vehicle through tail light change, so that the rear vehicle can timely react and avoid traffic accidents.

In order to achieve the above object, the invention provides the following technical solution: an intelligent detection and tail light control system for an automobile, comprising: a tail light module used for controlling the change of the tail light of the vehicle; a detection module used for detecting driving data of the rear vehicle and the subject vehicle; an intelligent operation module used for performing operation and judgment on the driving data measured by the detection module and sending a judgment result to the tail light module; and an ECU controlled power supply module for supplying power to the above mentioned functional modules.

Through the above technical solution, the tail light module regulates and controls the voltage and the current of the automobile tail light so as to control the change of the tail light; the detection module can be a detection device such as millimeter wave radar, a laser radar, an ultrasonic wave, a camera and the like, and can detect and judge parameters such as a distance between the front vehicle and the rear vehicle, and a speed and an acceleration and the like of the front vehicle and the rear vehicle; and if the detection shows the front vehicle and the rear vehicle being too close or other emergency situations, according to the degree of the distance the intelligent operation module sends a signal to the tail light module for it to act, so that the rear vehicle can see the change of the tail light of the front vehicle and responds in advance to avoid traffic accidents.

Preferably, the driving data comprises the real-time speed, the acceleration, the relative speed, the relative acceleration of the subject vehicle and the rear vehicle and the distance therebetween.

According to the technical solution, the detection module detects and calculates the driving data, and the calculation result is given in real time so that it is convenient for the intelligent operation module to judge and timely inform the rear vehicle.

Preferably, the detection module comprises a detection unit and an operation unit, wherein the detection unit is used for detecting the relative speed, the distance, the angle and the like of the subject vehicle and the rear vehicle, and the operation unit is used for calculating the real-time speed, the acceleration and relative acceleration of the subject vehicle and the rear vehicle.

According to the above technical solution, by calculating the relative speed and relative acceleration, it is easier to judge whether the two automobiles continue to approach, so that a more effective tail light prompt is made.

Preferably, the intelligent operation module presets a critical value of driving data of the front vehicle and the rear vehicle, such that when the driving data received by the intelligent operation module exceeds the critical value, the intelligent operation module sends a control signal to the tail light module.

Through the above technical solution, when the driving data exceeds the critical value, the intelligent operation module sends an LED modulating signal to the tail light module to timely control the change of the tail light so as to remind the rear vehicle.

Preferably, the tail light comprises a brake light, a steering light, a reversing light and an indicator light; and the change of tail lights comprises one or more of tail light brightness change, tail light brightness increase and decrease speed change, tail light brightness increase and decrease amplitude change, tail light flicker and tail light on-off dynamic combination change.

According to the above technical solution, the driver of the rear vehicle is reminded of timely response through the change of various forms of the tail light, and the change of the tail light is not limited to the above.

Preferably, the ECU controlled power supply module is connected with the tail light module through a power supply BUS; and the intelligent operation module sends an LED modulating signal generated by the judgment result to the ECU to control the power supply module, and the ECU controlled power supply module regulates and controls the current and voltage of the tail light according to the LED modulating signal so as to control the dynamic change of the brightness of the tail light.

Preferably, the detection module is connected with the tail light module through a control BUS; and the intelligent operation module sends the LED modulating signal generated by the judgment result to the detection module through a communication BUS, and the detection module performs LED modulation control on the tail light module; and the detection module sends switch and dimming flickering signals to the tail light module through the control BUS.

According to the above technical solution, the detection module can send signals measured by detection devices such as millimeter wave radars, laser radars, ultrasonic waves or cameras to the intelligent operation module through the communication BUS, and the intelligent operation module obtains LED modulating signals after the operation is completed. The ECU controlled power supply module carries out voltage and current regulation and control through a power supply BUS, and the intelligent operation module can directly control the power supply BUS to carry out LED modulation on the tail light, and the intelligent operation module can also send an LED modulating signal command to the detection module through the communication BUS for the detection module to carry out LED modulation control on the tail light.

The invention also provides a control method for the intelligent detection and tail light control system for automobiles, comprising the steps as follows:

1) the detection module detects driving data of the subject vehicle and the rear vehicle in real time and sends the driving data to the intelligent operation module;
2) the intelligent operation module compares the driving data with a preset critical value and judges a comparison result; and if the comparison result exceeds the critical value, then an LED modulating signal is generated;
3) the intelligent operation module sends the LED modulating signal to the ECU controlled power supply module, and the ECU controlled power supply module regulates and controls the current and voltage of the tail light according to the LED modulating signal so as to control the dynamic change of the brightness of the tail light;
4) the intelligent operation module can also send the LED modulating signal generated by the judgment result to the detection module through a communication BUS, and the detection module performs LED modulation control on the tail light module; and
5) the tail light module controls the tail light of the vehicle to change according to the LED modulating signal.

Preferably, the intelligent operation module also carries out operation on driving data of the two vehicles and sends an operation result to a collision prevention system of the rear vehicle, and the collision prevention system of the rear vehicle judges whether to control the rear vehicle action or not.

According to the technical solution, the intelligent operation module sends operation results, such as the real-time speed, acceleration, relative speed, relative acceleration and the distance, to the detection module of the rear vehicle through the manner of tail light communication, and the detection module of the rear vehicle and the intelligent operation module carry out operation to judge whether there is a collision crisis and to determine whether to start the anti-collision function of the collision prevention system to improve driving safety.

In summary, the invention has the following beneficial effects: without the intervention of the driver of the front vehicle, the tail lights can be automatically controlled by intelligent control; the action of the dynamic brightness of the tail light is based on detecting signals such as the speed and acceleration of the rear vehicle, the distance between the rear vehicle and the subject vehicle, and the speed and acceleration of the subject vehicle; and the driver of the rear vehicle can timely see the change of the tail light of the front vehicle so as to react instead of waiting until the driver of the front vehicle steps on the brake to react, so that a maximized safety and anti-collision purpose can be achieved.

DETAILED DESCRIPTION OF THE INVENTION

The present invention will now be described in further detail with reference to the accompanying drawings.

Embodiments

Figure 1:
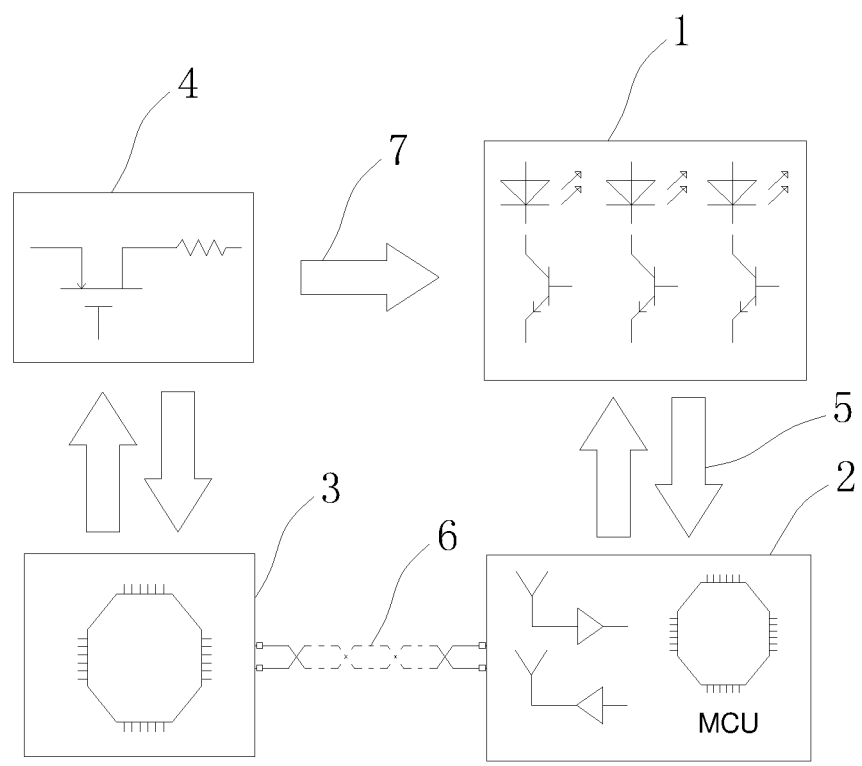
FIG. 1 is a block diagram of modules of the present invention.

Referring to FIG. 1, an intelligent detection and tail light control system for an automobile is shown, comprising a tail light module 1, a detection module 2, an intelligent operation module 3 and an ECU controlled power supply module 4. Wherein the tail light module 1 is used for controlling the tail light change of the automobile; the detection module 2 is connected with the tail light module 1 through a control BUS 5 and is used for detecting driving data of the rear vehicle and the subject vehicle; the intelligent operation module 3 is connected with the detection module 2 through a communication BUS 6 for operating and judging the driving data measured by the detection module 2, and sending a judgment result to the tail light module 1; and the ECU controlled power supply module 4 is used for supplying power to the above-mentioned functional modules.

The tail light module 1 regulates and controls the voltage and the current of the automobile tail lights so as to control the change of the tail lights.

The detection module 2 can be a detection device such as millimeter wave radar, a laser radar, an ultrasonic wave, a camera and the like, and can detect and judge the distance between the front vehicle and the rear vehicle and the speed thereof. If the detection shows the front vehicle and the rear vehicle being too close or other emergency situations, according to the degree of the distance the intelligent operation module 3 sends a signal to the tail light module 1 for it to act, so that the rear vehicle can see the change of the tail light of the front vehicle and responds in advance instead of waiting until the driver of the front vehicle steps on the brake to react, and thus avoids traffic accidents.

In the embodiment, the tail light comprises a brake light, a steering light, a reversing light or other types of indicator lights; the change of tail lights comprises one or more of tail light brightness change, tail light brightness increase and decrease speed change, tail light brightness increase and decrease amplitude change, tail light flicker and tail light on-off dynamic combination change; and the driver of the rear vehicle is reminded of timely reaction through various forms of the change of the tail lights. Of course, the tail light change pattern is not limited to the above, and any tail light change pattern for warning the rear vehicle may be applied to this embodiment. For example, the tail light performs PWM dimming and flickering at frequencies ranging from 100 MHz to 1 MHz, and the detection module 2 sends PWM signals through the control BUS 5, wherein if the switching frequency is more than 2 kHz, the LED of the tail light has light intensity change, and if the switching frequency is less than 2 kHz, the LED of the tail light has flickering change.

In the embodiment, the driving data comprises the real-time speed, the acceleration, the relative speed, the relative acceleration, the distance, the angle and the like of the subject vehicle and the rear vehicle. The detection module 2 detects and calculates the above driving data and gives a calculation result in real time, making it convenient for the intelligent operation module 3 to judge and inform the rear vehicle in time.

The detection module 2 comprises a detection unit and an operation unit, wherein the detection unit is millimeter wave radar (millimeter wave is a special radar technology using short-wavelength electromagnetic waves. Electromagnetic signals emitted by the radar system are blocked by an object on the emission path and then reflected. By capturing the reflected signal, the radar system can determine the distance, the velocity and the angle of the object), used for detecting the relative speed, the distance and the angle of the subject vehicle and the rear vehicle; and MCU serves as an operation unit and is used for calculating the real-time speed, the acceleration and relative acceleration of the subject vehicle and the rear vehicle. And the relative speed and the relative acceleration are calculated, so that whether the two vehicles continue to approach or not can be judged more easily, so a more effective tail light prompt can be made.

In the embodiment, the intelligent operation module 3 presets a critical value of driving data of the front vehicle and the rear vehicle, such that when the driving data received by the intelligent operation module 3 exceeds the critical value, the intelligent operation module sends a control signal to the tail light module 1 to control the tail light change in time so as to remind the rear vehicle.

Figure 2:
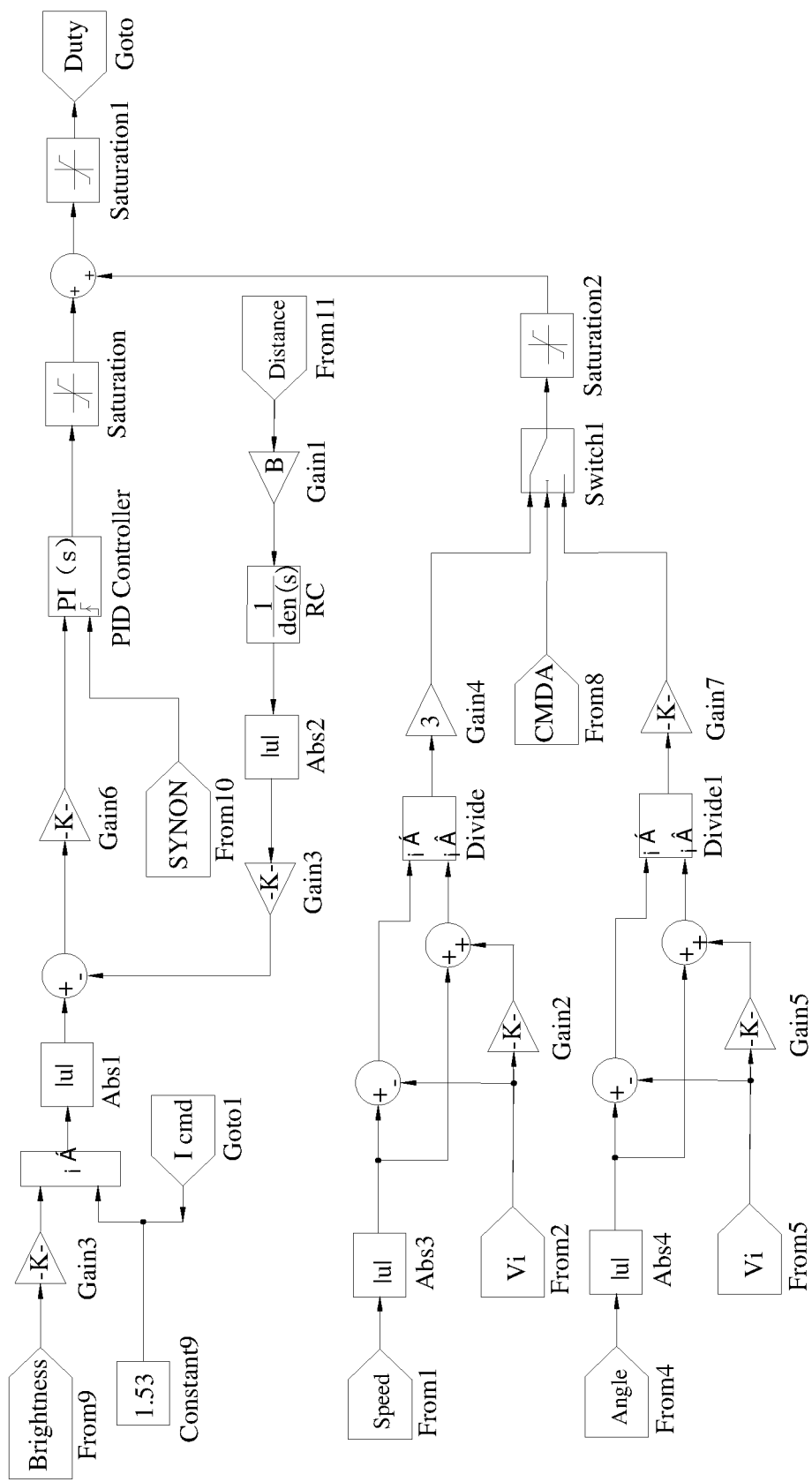
FIG. 2 is a control diagram of PID.

The intelligent operation module 3 receives driving data sent by the detection module 2 and calculates an analog or PWM dimming mode of the LED through an algorithm, wherein the algorithm can be PID or fuzzy control or other modes, and the principle of the PID algorithm can be referred to FIG. 2.

The DSP/MCU in the intelligent operation module 3 communicates with the DSP/MCU in the detection module 2 via CAN/LIN. The DSP/MCU control in the detection module 2 may use a drive IC with a communication such as BD2808MUV and the like, or a direct drive LED.

In this embodiment, the ECU controlled power supply module 4 connects to the tail light module 1 through the power supply BUS 7. When the driving data exceeds the critical value, the intelligent operation module 3 sends an LED modulating signal to the ECU controlled power supply module 4, and the ECU controlled power supply module 4 regulates and controls the current and voltage of the tail light according to the LED modulating signal so as to control the change of the tail light. The LED modulating signal can be an AM signal, an FM signal or a PWM signal, and the ECU controlled power supply module 4 is mainly composed of a control power supply and can be, but is not limited to, a BUCK, a Boost or a BUCK-Boost structure.

Because the detection module 2 is connected with the tail light module 1 through the control BUS 5, the intelligent operation module 3 can also send LED modulating signal to the detection module 2 through the communication BUS 6, and the detection module 2 performs LED modulation control on the tail light module 1. And the detection module 2 sends switch and dimming flickering signals to the tail light module 1 through the control BUS 5.

In the embodiment, an HSD high-end driving chip is arranged in the ECU controlled power supply module, such as an HSD with a model number L9848 and whether a power supply BUS 7 voltage is supplied or not is controlled through the HSD. The ECU controlled power supply module can control the HSD to enable the power supply BUS 7 voltage to be PWM form so that the tail light module 1 operates in a PWM mode, or control the HSD current to adjust the current outputted to the tail light module 1, thereby controlling the tail light change.

The working principle of the embodiment is as follows: the main function of the detection module 2 and the intelligent transportation module is to detect the speed, the distance, the acceleration and other information of the rear vehicle and the subject vehicle so as to judge the possibility that the rear vehicle collides with the subject vehicle. When the rear vehicle is found to be close to the subject vehicle, the driver of the subject vehicle does not need to step down the brake pedal, and the dynamic brightness change of the tail light can be automatically controlled according to the speed, the distance and the acceleration to remind the driver of the rear vehicle, so that the driver of the rear vehicle can take corresponding actions in time and the purpose of safety and anti-collision is achieved.

In addition, the vehicle body can be additionally designed with an optical receiver for receiving optical communication of the front vehicle. After the tail light source of the front vehicle changes, for example, a front vehicle indicator light flashes at a high frequency, a light receiver of the rear vehicle receives the light signal which can contain information of the front vehicle, such as the distance, the speed and the acceleration. The detection module 2 of the rear vehicle transmits the signal to the intelligent operation module 3 through a communication BUS 6, and the intelligent operation module 3 determines whether to transmit the signal to an external BCM according to a self-algorithm, wherein BCM controls the action of the collision prevention system of the rear vehicle. Therefore, the situation that the speed of the rear vehicle is too fast for the driver to brake the vehicle, which leads to accidents, is prevented.

The intelligent operation module 3 can also combine the information such as the dynamic information, the navigation and GPS of the front vehicle detected by the vehicle itself to determine in advance whether there is a brake condition or not through artificial intelligence calculation, and if there is one, the tail light change may be controlled in advance. And the change of the environmental light source can also be integrated such that the surrounding environment can be detected. If the rear vehicle shakes left and right, the phenomenon can be detected and judged by the detection module 2 firstly, and then switch and dimming flickering signals are sent to the tail light module 1 through the control BUS 5.

This particular embodiment is merely illustrative of the invention and is not intended to limit the invention. Those skilled in the art can make modifications to the present embodiment that involve no inventive contribution as needed after reading the description, and the modifications are protected by the patent law as long as they are within the scope of the claims of the invention.

The invention claimed is:

1. An intelligent detection and tail light control system for automobiles, comprising: a tail light module used for controlling a change of a tail light of an automobile; a detection module used for detecting driving data of a rear vehicle and a subject vehicle; an intelligent operation module used for performing operation and judgment on driving data measured by the detection module and sending a judgment result to the tail light module; and an ECU controlled power supply module to supply power to the above mentioned functional modules;

wherein the driving data comprises a real-time speed, an acceleration, a relative speed, a relative acceleration of the subject vehicle and the rear vehicle and a distance therebetween; and the detection module comprises a detection unit and an operation unit, wherein the detection unit is used for detecting the relative speed, the distance, and an angle of the subject vehicle and the rear vehicle, and the operation unit is used for calculating the real-time speed, the acceleration and the relative acceleration of the subject vehicle and the rear vehicle.

2. The intelligent detection and tail light control system for automobiles according to claim 1, wherein the intelligent operation module presets a critical value of driving data of the subject vehicle and the rear vehicle, and sends a control signal to the tail light module when the driving data received by the intelligent operation module exceeds the critical value.

3. The intelligent detection and tail light control system for automobiles according to claim 1, wherein the tail light comprises a brake light, a steering light, a reversing light and an indicator light; and the change of the tail light comprises one or more of tail light brightness change, tail light brightness increase and decrease speed change, tail light brightness increase and decrease amplitude change, tail light flicker and tail light on-off dynamic combination change.

4. The intelligent detection and tail light control system for automobiles according to claim 1, wherein the ECU controlled power supply module is connected with the tail light module through a power supply BUS; and the intelligent operation module sends an LED modulating signal generated by the judgment result to the ECU controlled power supply module, and the ECU controlled power supply module regulates and controls a current and voltage of the tail light according to the LED modulating signal so as to control the dynamic change of the brightness of the tail light.

5. The intelligent detection and tail light control system for automobiles according to claim 1, wherein the detection module is connected with the tail light module through a control BUS; the intelligent operation module sends an LED modulating signal generated by the judgment result to the detection module through a communication BUS, and the detection module performs LED modulation control on the tail light module; and the detection module sends switch and dimming flickering signals to the tail light module through the control BUS.

6. A control method for the intelligent detection and tail light control system for automobiles according to claim 1, comprising the steps of: 1) detecting driving data of the subject vehicle and the rear vehicle in real time and sending the driving data to the intelligent operation module by the detection module; 2) comparing the driving data with a preset critical value and judging a comparison result by the intelligent operation module; and generating an LED modulating signal if the comparison result exceeds the critical value; 3) sending the LED modulating signal to the ECU controlled power supply module by the intelligent operation module, and regulating and controlling a current and voltage of the tail light according to the LED modulating signal by the ECU controlled power supply module so as to control the dynamic change of the brightness of the tail light; 4) sending the LED modulating signal generated by the judgment result to the detection module through a communication BUS by the intelligent operation module, and performing LED modulation control on the tail light module by the detection module; and 5) controlling the tail light of the vehicle to change according to the LED modulating signal by the tail light module.

7. The control method for the intelligent detection and tail light control system for automobiles according to claim 6, wherein the intelligent operation module also carries out an operation on the driving data of the two vehicles and sends an operation result to a collision prevention system of the rear vehicle, and the collision prevention system of the rear vehicle judges whether to control a rear vehicle action or not.

\* \* \* \* \*

UNITED STATES PATENT AND TRADEMARK OFFICE
CERTIFICATE OF CORRECTION

PATENT NO.            : 10,759,338 B1  
APPLICATION NO.       : 16/423213  
DATED                 : September 1, 2020  
INVENTOR(S)           : Zian Ke Page 1 of 1

It is certified that error appears in the above-identified patent and that said Letters Patent is hereby corrected as shown below:

On the Title Page

In Item (73) Assignee Data, the correct data should be "LASTER TECH AUTOMOTIVE (SHANGHAI) CO., LTD., SHANGHAI (CN)".

Signed and Sealed this  
Thirteenth Day of October, 2020

Andrei Iancu  
*Director of the United States Patent and Trademark Office*